(12) United States Patent
Hahn

(10) Patent No.: US 6,729,673 B2
(45) Date of Patent: May 4, 2004

(54) REMOVABLE VEHICLE ROOF WITH FOLDING TOP

(75) Inventor: Gerald Hahn, Hamburg (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/305,407

(22) Filed: Nov. 26, 2002

(65) Prior Publication Data

US 2003/0098594 A1 May 29, 2003

(30) Foreign Application Priority Data

Nov. 27, 2001 (DE) ........................................ 101 57 819

(51) Int. Cl.⁷ ................................................. B60J 7/12
(52) U.S. Cl. ............................ 296/107.12; 296/107.09; 296/108; 296/117
(58) Field of Search ...................... 296/107.01, 107.08, 296/107.09, 107.12, 107.16, 108, 121, 122, 116, 117

(56) References Cited

U.S. PATENT DOCUMENTS

| | | | | |
|---|---|---|---|---|
| 5,042,868 A | * | 8/1991 | Nothaft et al. | 296/107.09 |
| 5,671,966 A | * | 9/1997 | Busch | 296/107.16 |
| 5,749,619 A | * | 5/1998 | Mentink | 296/107.09 |
| 5,998,948 A | * | 12/1999 | Lange et al. | 296/122 |
| 6,039,382 A | * | 3/2000 | Mather et al. | 296/107.01 |
| 6,048,021 A | * | 4/2000 | Sautter, Jr. | 296/107.08 |
| 6,270,143 B1 | * | 8/2001 | Heselhaus et al. | 296/107.01 |
| 6,347,827 B1 | * | 2/2002 | Maass | 296/107.09 |
| 6,422,636 B2 | * | 7/2002 | Mentink | 296/107.01 |
| 6,454,342 B2 | * | 9/2002 | Heselhaus et al. | 296/107.07 |
| 6,464,284 B2 | * | 10/2002 | Neubrand | 296/107.01 |
| 6,601,907 B2 | * | 8/2003 | Gutendorf et al. | 296/122 |

FOREIGN PATENT DOCUMENTS

| | | |
|---|---|---|
| DE | 37 33 842 | 2/1989 |
| DE | G89 05 571.3 | 11/1989 |
| DE | 40 31 270 | 10/1991 |
| DE | 41 30 133 | 8/1993 |
| DE | 295 16 415 | 1/1996 |
| DE | 0 749 859 | 12/1996 |
| DE | 197 32 672 | 2/1999 |
| EP | 1 024 042 | 8/2000 |
| EP | 1 104 710 | 6/2001 |

* cited by examiner

Primary Examiner—D. Glenn Dayoan
Assistant Examiner—Gregory Blankenship
(74) Attorney, Agent, or Firm—Klaus J. Bach

(57) ABSTRACT

In a vehicle roof arrangement with a folding top which is movable between a closed position and a storage position, a support and operating linkage is provided by which the roof material is tensioned when the roof is closed by a tensioning structure which is held in position by an over-center tensioning linkage. For opening the roof, the tensioning linkage is first moved out of its over-center position by an auxiliary actuator and the tension in the roof is released which is then lowered by the operating linkage into a rear storage compartment.

4 Claims, 4 Drawing Sheets

REMOVABLE VEHICLE ROOF WITH FOLDING TOP

BACKGROUND OF THE INVENTION

The invention relates to a vehicle roof with a folding top, which is movable between a closed position, in which the roof covers an interior space of a vehicle and an open position, in which the roof is deposited in a rear storage compartment. The folding top includes a top linkage supporting a top cover material.

EP 0 749 859 A1 discloses a folding rooftop for a convertible vehicle which includes top links with a roof material supported by it and which is movable between a closed position covering the interior of the vehicle and a storage position in which the folding roof is deposited in a rear storage compartment. In order to maintain the roof material under tension also in the storage position a material tensioning linkage is provided which, in the closed position, extends about horizontally across the rear area of the folding roof transversely to the longitudinal vehicle direction and keeps the cover material under tension. The material tensioning linkage is part of the roof linkage and is pivotally supported on the vehicle body by way of a pivot bearing. The material tensioning linkage can be moved by an auxiliary actuator between a tensioning position and an upwardly pivoted release position. The other linkage parts of the roof linkage are actuated by a main actuator for opening and closing the vehicle roof.

The auxiliary actuator does not directly engage the material tensioning rod, but a tensioning link, which is pivotally supported on the vehicle body mounted main pivot bearing and which operates a two part support linkage by way of which the material tensioning linkage can be moved to a tensioning position.

The folding roof requires a relatively large storage space when the roof is open since the top tensioning rod as well as the other linkage parts are pivotally supported by the main vehicle body-based support bearing and consequently perform only a pivotal roof operating motion during the transfer between the closed and the storage positions so that all linkage parts of the roof top are disposed in the storage position horizontally at the level of the main support bearing or at an angle that is downwardly inclined. Such an arrangement requires a large storage space.

EP 1 104 710 A1 discloses a movable vehicle roof with a folding top and a folding top support linkage including a roof material tensioning bar for engaging the roof top material when the folding vehicle roof is closed. The roof material tensioning bar is locked in its tensioning position by a two-part support linkage so as to prevent accidental opening of the material tensioning bar. The linkage is also engaged by a two part tensioning rod which includes two pivotally interconnected tensioning arms of which a first tensioning arm is pivotally connected to an arm of the linkage and a second tensioning arm is pivotally connected to a pivot lever which is operated by an auxiliary actuator for the transfer of the material top tensioning rod from a release to a tensioning position.

In order to ensure that the material top tensioning rod remains in its closed position when the vehicle roof is closed and is not accidentally raised by wind forces acting on the outer surface of the vehicle top the auxiliary actuator must provide a permanent retaining force, in order to prevent any movement in the transfer path between the auxiliary actuator and the top material tensioning rod. The auxiliary actuator is a hydraulic operating element, which must be locked to prevent any movement while the vehicle roof is closed. To achieve such locking additional locking means are required.

It is the object of the present invention to provide a folding vehicle roof, which, with the roof open, can be deposited in a rear storage compartment in a space-saving manner.

SUMMARY OF THE INVENTION

In a vehicle roof arrangement with a folding top which is movable between a closed position and a storage position, a support and operating linkage is provided by which the roof material is tensioned, when the roof is closed, by a tensioning structure which is held in position by an over-center tensioning linkage. For opening the roof, the tensioning linkage is first moved out of its over-center position by an auxiliary actuator and the tension in the roof is released which is then lowered by the operating linkage in a rear storage compartment.

The roof material tensioning rod is therefore subjected to a double pivot movement, that is, a first pivot movement about its own pivot axis on the vehicle body-mounted main support arm and a second pivot movement together with the main support arm relative to the vehicle body. This combined pivot movement about two spaced parallel pivot axes permits the tensioning rod to be deposited in an about horizontal position when the vehicle roof is open. In this position the tensioning rod is furthermore lowered with respect to its active tensioning position which it assumes when the vehicle roof is closed. In the storage position the tensioning rod is lowered by an essentially translatory downward movement toward the bottom of the storage compartment while maintaining with its original orientation. In this way, a sliding relative motion between the tensioning rod and the vehicle top storage compartment bottom is avoided. Because of the horizontal storage position of the tensioning rod, it can be deposited flat on the storage compartment bottom whereby the storage space requirements are substantially reduced in comparison with an inclined position so that a substantially reduced storage volume is required. It is furthermore possible to deposit the rest of the roof support linkage above the tensioning rod.

Another advantage of this arrangement resides in the fact that an energy-consuming movement of the material tensioning rods from its tensioning position to the open-roof release position is basically needed only for the transfer of the rest of the top operating linkage to the open position without detrimentally affecting the roof top material. When the release position of the roof tensioning rod has been reached the further actively guided movement of the roof tensioning rods by the main actuator can follow wherein the main support arm is moved between the opening and the closing positions. Another relative movement between the main support arm and the roof tensioning rods can be achieved positively by the use of suitable guide elements.

It is particularly possible to provide for the tensioning rod an auxiliary actuator which, at the beginning of the opening movement of the roof, lifts the roof tensioning rod and which, in the release position of the tensioning rods reaches its end position timely before the main operating is moved. Subsequently, the auxiliary actuator having already reached its final end position becomes a passive guide element, which, upon pivoting of the main support arm by the main actuator provides for a relative pivot movement of the top material tensioning rod with respect to the main support arm.

Expediently, in the folding roof closing position, the folding roof material tensioning rod is held in the tensioning position by a support linkage which is preferably a two part linkage with an intermediate joint and which, in the tensioning position, is at or near a center position in order to prevent the unintentional release of the material tensioning rods from the tensioning position. The support linkage is preferably coupled with a tensioning linkage to which the auxiliary actuator is preferably connected for the transfer of the material tensioning rod between the tensioning and release positions. The tensioning and release positions. The tensioning rods are also two part structures and include a first and a second tensioning arm which are each pivotally connected pivotally to the main arm or respectively, the support linkage and which are joined together by an intermediate joint. The tensioning linkage may assume also an over-center position when the material tensioning rod is in the tensioning position. The auxiliary actuator, by way of which the material tensioning rod is operated during the first movement phase upon opening of the root, is preferably connected to that tensioning arm which is pivotally connected to the main support arm.

Further advantages and expedient embodiments will become apparent from the following description of the invention on the basis of the accompanying drawings.

DESCRIPTION OF PREFERRED EMBODIMENTS

Figure 1:
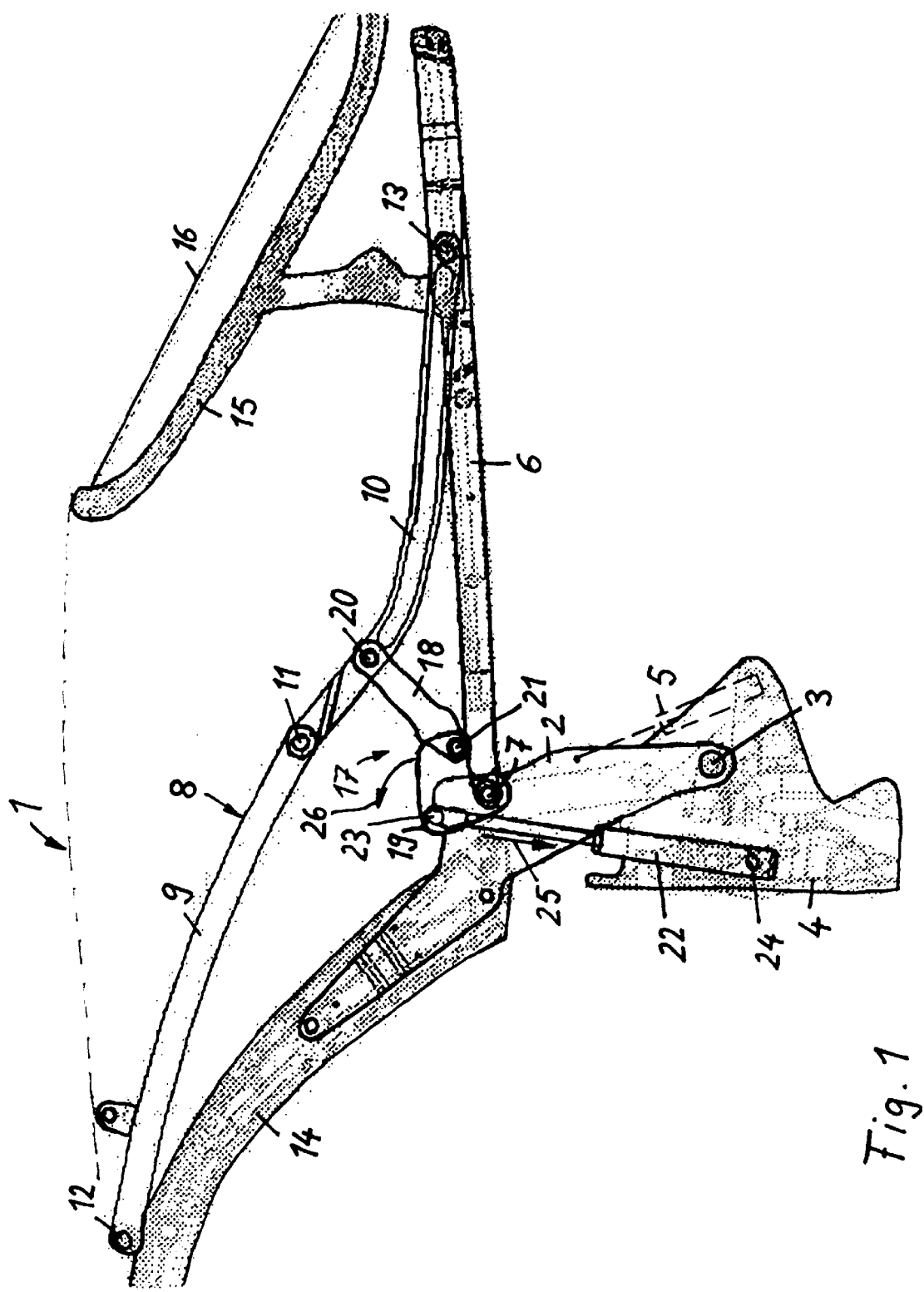
FIG. 1 is a side view of a movable folding roof with an operating linkage including a folding roof material tensioning rod in a position in which the folding roof is closed and the tensioning rod is in the roof material tensioning position.

In the figures, the same components are designated by the same reference numerals.

Figure 4:
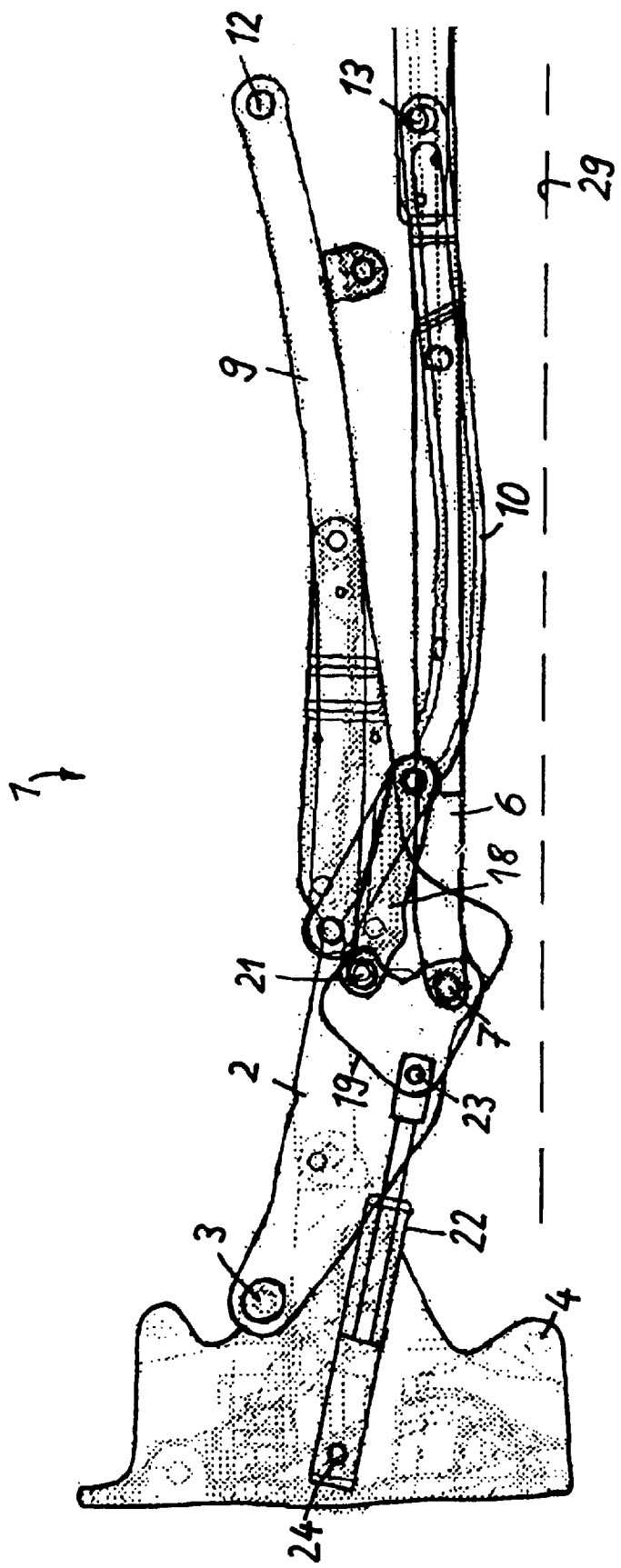
FIG. 4 shows the whole folding roof folded and lowered into a rear storage space.

The folding roof operating mechanism 1 as shown in FIG. 1, which is part of a folding roof movable between closed and open positions, comprises a plurality of individual kinematically coupled linkage components supporting the folding roof material which is indicated in FIG. 1 by a dashed line and which extends forwardly from a rear window 16, or respectively, the frame 15 thereof. The operating mechanism 1 comprises a main support arm 2 which is pivotally supported by way of a joint 3 on a console 4 mounted on the vehicle body. The main support arm can be pivoted, by means of a main actuator 5 shown in dashed lines, particularly a hydraulic cylinder, between the closed position of the folding roof as shown in FIG. 1 and an open or storage position of the folding roof as shown in FIG. 4.

The roof operating mechanism 1 further includes a material tensioning rod 6, which is pivotally supported on the main support arm 2 by a joint 7. The pivot axes of the joints 3 and 7 extend parallel and in a direction transverse to the longitudinal vehicle axis. The material tensioning rod 6 is, in the tensioning position as shown in FIG. 1, oriented essentially horizontally and is held in this tensioning position by a support linkage 8, which includes two support levers 9 and 10 joined by an intermediate joint 11. The front support lever 9 extending toward the front of the vehicle is pivotally connected, by way of a joint 12, to a main support column 14 of the operating mechanism which column is firmly mounted to the main support arm 2. The rear support lever 10 extending toward the rear of the vehicle is pivotally connected to the material tensioning rod 6 by way of a pivot joint 13.

The support linkage 8 is in, or near, a dead center position when the material tensioning rod 6 is in the folding roof material tensioning position. In this position the intermediate joint 11 is on, or close to, a line defined by the two joints 12 and 13 of the front and rear support levers 9 and 10. The intermediate joint 11 is held in this position by a tensioning linkage 17, by which it also can be moved to a release position, in which the material tensioning rod is raised to release the tension in the folding roof material. For the transfer to the release position, the intermediate joint 11 is moved across the line defined by the joints 12 and 13 out of an over-center position. The tensioning linkage 17 comprises a first tensioning arm 18 and a second tensioning arm 19, which are interconnected pivotally by way of an intermediate joint 21. The first tensioning arm 18 is furthermore pivotally connected to the rear support lever 10 of the support linkage 8 by a pivot joint 20. Expediently the pivot joint is disposed near the intermediate joint 11 interconnecting the two support levers 9 and 10.

The second tensioning arm 19 is pivotally connected to the main support arm 2 by way of the joint 7 which, at the same time, is the joint of the material tensioning rod 6. Furthermore, an auxiliary actuator 22, particularly a hydraulic cylinder, is provided which, at one end, is pivotally connected to the second tensioning arm 19 by a joint 23 and, at the other end, to the console 4. Together with the joint 7 and the joint 21 the joint 23 forms a triangular arrangement.

Figure 2:
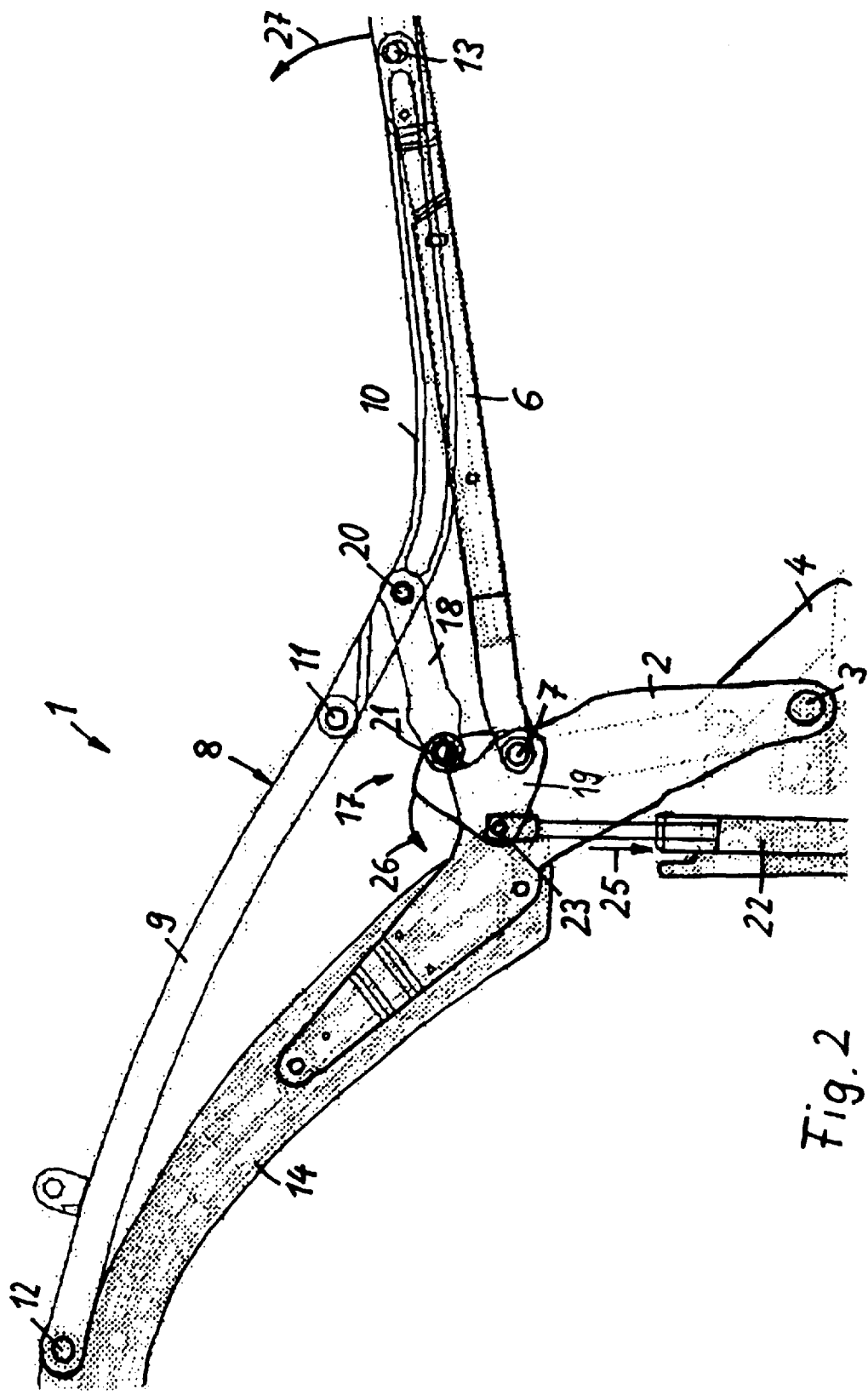
FIG. 2 is a view corresponding to that of FIG. 1 wherein the tensioning rod is slightly raised from its tensioning position in the direction of the release position.

In the tensioning position of the roof material tensioning rod 6, the tensioning linkage 17 is disposed in an over-center position, in which the intermediate joint 21 of the first tensioning arm 18 is disposed beyond the connecting line between the outer pivot joint 20 with the support lever 10 and the opposite joint 7 with the main support arm 2, so that the intermediate joint 21 has to pass the connecting line when being moved out of the over-center position. In order to move the material tensioning rod out of its tensioning position shown in FIG. 1 into the tension releasing position, the auxiliary actuator 22 is operated—while the main support arm 2 remains in its position—such that the operating piston is retracted in a direction as indicated by the arrow 25. Since the second tensioning arm 19 is pivotally supported on the main support arm 2 by way of the joint 7, the linear actuating movement of the auxiliary actuator 22 is converted to a pivot movement of the second tensioning arm 19 in a counter-clockwise direction as indicated by the arrow 26. In this way, the tensioning linkage 17 as well as the support linkage 8 are moved out of their respective over dead center positions into positions as shown in FIG. 2, in which the material tensioning rod 6 is still disposed essentially horizontally but is no longer locked by the over center position of the tensioning linkage.

Figure 3:
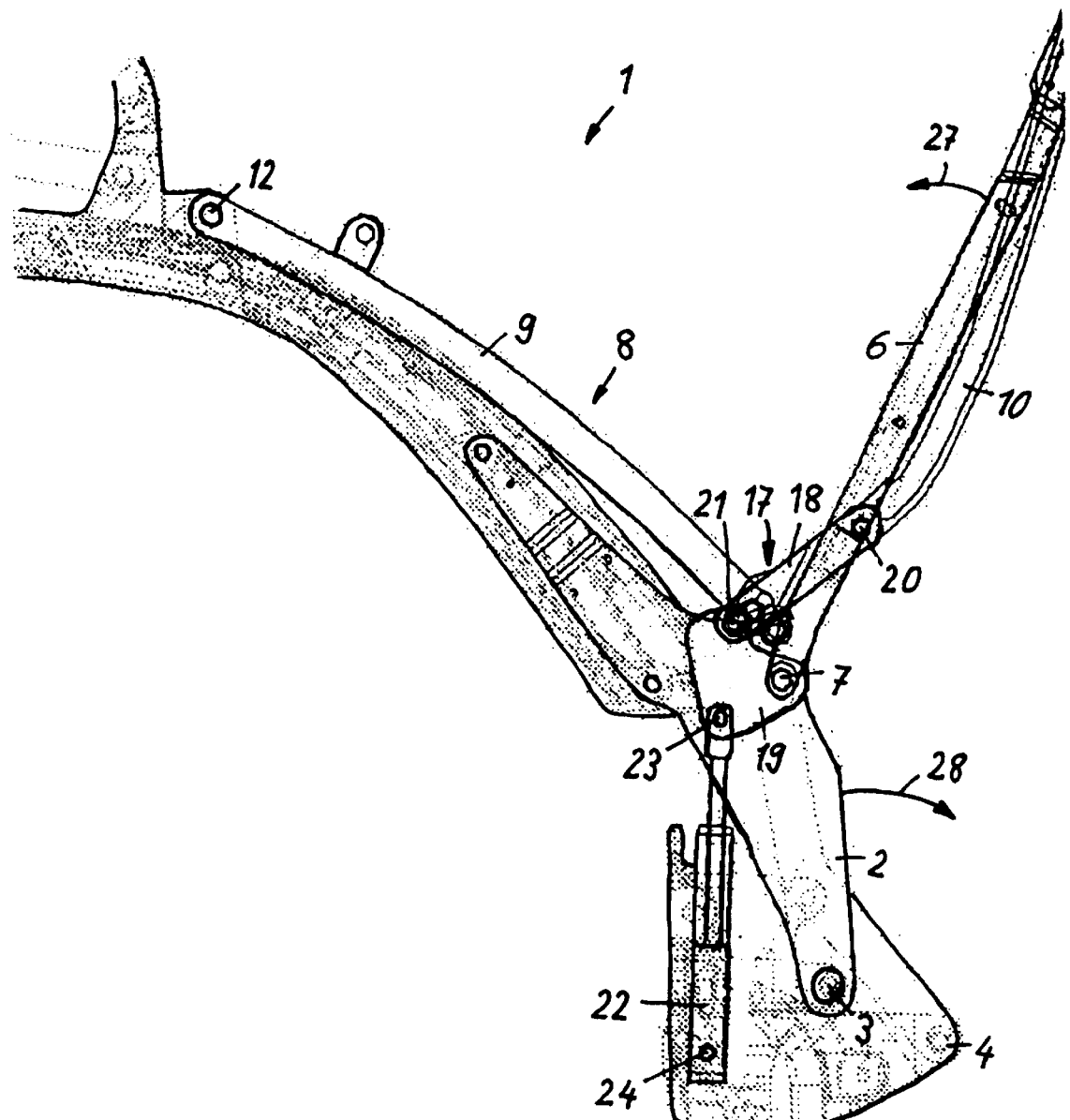
FIG. 3 is a view corresponding to that of FIGS. 1 and 2 wherein however the material tensioning rod is in a raised, tension releasing position.

Upon further actuation of the auxiliary actuator 22 in the direction of the arrow 25, the second tensioning arm 19 is further pivoted in the direction of the arrows 2 relative to the main support arm 2 so that the material tensioning rod 6 is raised and pivoted about its joint 7 in the direction of the arrow 27. The tensioning rod 6 is moved in this way to the position as shown in FIG. 3, in which the tensioning rod 6 is in a release position in which it is angled by about 45° with respect to its horizontal tensioning position. The support levers 9 and 10 at the support linkage 8 are correspondingly pivoted relative to each other about the intermediate joint 11. The piston of the actuator 22 is now fully retracted, so that the material tensioning rod 6 is not further pivoted in a counter-clockwise direction. The main support arm 2 remains in its original position corresponding to that in which the vehicle roof is closed.

For the transfer of the vehicle roof into the open or storage position, the tensioning rod 6 is first moved out of the release position as shown in FIG. 3 back into the position as shown in FIG. 1, in which the tensioning linkage 17 is in the over-center position corresponding to a closed roof position. The auxiliary actuator is again fully extended for this purpose. With the roof unlocked however, the main support arm 2 is now pivoted in the direction 28 (FIG. 3) by operation of the main actuator 5. During this pivot movement of the main support arm 2 from the position shown in FIG. 1 to the storage position as shown in FIG. 4 the piston or operating member of the auxiliary actuator 22 remains in its extended position so that also the distance between support joint 24 of the auxiliary actuator 22 on the console 4 and the joint 23 of the auxiliary actuator with the tensioning arm 19 of the tensioning linkage 17 remains in place during the pivot movement of the main support arm 2.

Because of the given distance between the support joint 24 of the auxiliary actuator 22 and the pivot joint 3 of the main support arm 2 on the console 4 and the constant length of the auxiliary actuator 22, with the pivot movement of the main support arm 2 in the direction of the arrow 28 the material tensioning rod 6 is now pivoted about its joint 7 relative to the main support arm 2 in counter-clockwise direction as indicated by the arrow 27. The auxiliary actuator 22 assumes in this process the function of a passive guide element since the pivot movement is provided for exclusively by the main actuator 5. Upon pivoting of the main support arm 2 about the joint 3, the material tensioning rod 6 and the support lever 10 are pivoted onto the support lever 9 and the main support column 14 and are lowered jointly into the storage compartment in a position as shown in FIG. 4. In this position, the main support arm 2 extends essentially horizontally and also the tensioning rod 6 is again essentially in a horizontal position, which is however lowered relative to the position as shown in FIG. 1. In the lowered position, the folding roof is disposed in a rear storage compartment 29 indicated by a dashed line.

What is claimed is:

1. A vehicle roof with folding top movable between a closed position in which it covers a passenger compartment of a vehicle and a storage position in which the roof is lowered into a rear storage compartment, including an operating mechanism provided with a vehicle top material, said operating mechanism comprising:

a main support arm (2) pivotally supported on a vehicle body part (4) a main actuator connected between said vehicle body part (4) and said main support arm (2), a tensioning rod (6) pivotally supported on said main support arm (2) and disposed in an essentially horizontal position when said vehicle roof is closed, wherein said vehicle roof including a vehicle top material is in a tensioned state and an auxiliary actuator (22) for moving the tensioning rod (6) between material tensioning and tension releasing positions, a two-part support linkage (8) by which the material tensioning rod (6) is held in a tensioning position when the vehicle roof is closed, said support linkage (8) including two support levers (9, 10) which are jointed by an intermediate joint (11) and extend between a support column (14) connected to said main support arm (2) and said tensioning rod (6), said intermediate joint being disposed essentially in a center position between the connecting joints (12, 13) of said two part linkage (8) when the vehicle roof is closed, a tensioning linkage (17) coupled with said support linkage (8) and including first and second tensioning arms (18, 19), which are pivotally joined at one of their ends, said first tensioning arm (18) being pivotally connected with its other end to said support linkage (8) and said second tensioning arm (19) being pivotally connected to said main support arm (2), said tensioning arms (18,19) being disposed in an over-center position when said vehicle roof is closed for safely holding said support levers (9, 10) with said intermediate joint (11) essentially in said center position when said vehicle roof is closed.

2. A vehicle roof according to claim 1, wherein said tensioning linkage (17) and said material tensioning rod (6) are connected to said main support arm by a common joint (7).

3. A vehicle roof according to claim 1, wherein said tensioning linkage (17) is connected to said support linkage (8) adjacent said intermediate joint (11) interconnecting said support levers (9, 10).

4. A vehicle roof according to claim 1, wherein said auxiliary actuator (22) is pivotally supported at one end on the vehicle body (4) and its other end is connected to said second tensioning arm (19) for rotating said second tensioning arm (19) about its joint (7) with said main support arm (2).

* * * * *